Figure 1:
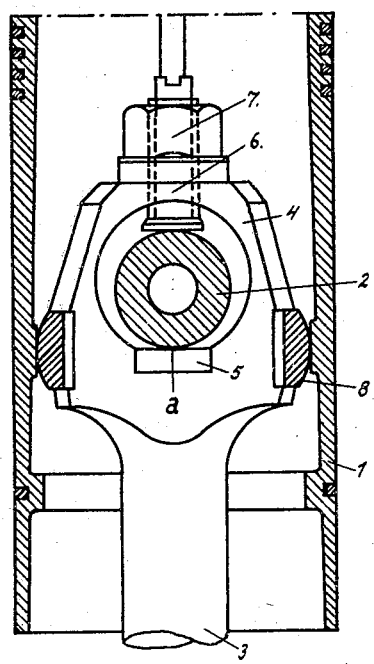
Figure 2:
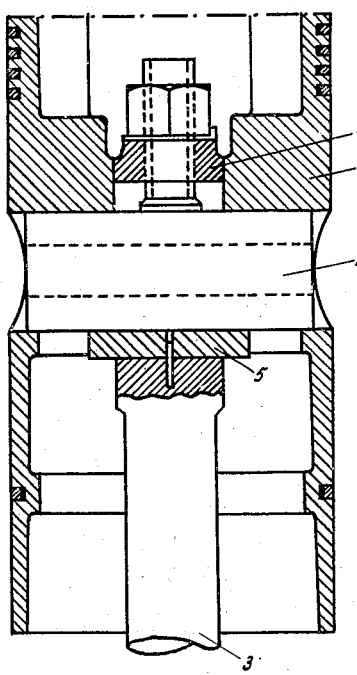

J. Brons
INVENTOR

April 22, 1930.                J. BRONS                1,755,347
            ENGINE PROVIDED WITH A PISTON AND A CONNECTING ROD
                   Filed Nov. 23, 1928    2 Sheets-Sheet 2

J. Brons
  INVENTOR

By Marks & Clark
       Attys.

Patented Apr. 22, 1930

1,755,347

UNITED STATES PATENT OFFICE

JAN BRONS, OF APPINGEDAM, NETHERLANDS, ASSIGNOR TO NAAMLOOZE VENNOOTSCHAP KROMHOUT MOTOREN FABRIEK D. GOEDKOOP JR., OF AMSTERDAM, NETHERLANDS, AND JOHAN HENDRIK DE IONGH, OF HILLIGERSBERG, NEAR ROTTERDAM, NETHERLANDS

ENGINE PROVIDED WITH A PISTON AND A CONNECTING ROD

Application filed November 23, 1928, Serial No. 321,470, and in the Netherlands December 8, 1927.

To prevent the sliding over the gudgeon pin in pistons provided with a connecting rod having a frame-like part on the end of the connecting rod or on the sides of the piston, said part being placed around the strongly secured gudgeon pin, an arrangement is already known by which it is attained that the planes of the said pin and of the frame-like part do exclusively roll down over each other. This construction shows in combination the following characteristic features. The radii of curvature of the planes of the gudgeon pin and of the frame, moving over each other, differ; the frame is movable with respect to the pin in a plane perpendicular to the centre line of said pin and the component of the power exerted by the connecting rod upon the surface of contact of the gudgeon pin with the frame in the direction of the surface of rolling (gang-way) is in every position of the connecting rod smaller than the frictional resistance between the two surfaces moving over each other.

Especially in horizontal machines, however, the frictional resistance is not always larger than the component of the piston-pressure increased with the component of the weight of the connecting rod and the same may be the case in machines, in which the weight of the appliances of the driving gear is so large and the rotation number so high that with low charges the inertia will at certain points of the stroke almost equal the piston-pressure, there being for said reason almost no pressure between the underside of the frame and the gudgeon pin.

For this reason it is the purpose of the invention to attain the same object by an arrangement which is independent of the frictional resistance between the surfaces rolling down over each other. To this end the frame-like part is formed according to the invention at the outside partly as a revolving body, of which the axis of revolution coincides in the middle position of the connecting rod with the line of contact of the gudgeon pin with the surface of rolling of the frame-like part and which is guided in a cylindrical, or may be prismatical, portion of the piston with the same axis.

In the drawings, is represented, by way of example, a construction according to the invention, in two vertical sections at right angles.

The gudgeon pin 2 of the piston is strongly secured in the piston 1 whilst the connecting rod 3 is provided with a frame-like end 4. Said end is at the underside provided with a steel bearing member 5, which provides a rolling surface when the connecting rod is moving and at the upperside with an adjusting member 6, upon which an adjusting nut 7 is screwed.

Further, the end 4 is provided with a spherical portion 8, fitting closely in a cylindrical portion of the piston. The centre of the circle section according to the section view in Figure 1 is situated at the point $a$, which corresponds with the line of contact of the gudgeon pin with the rolling surface of member 5.

On the motion of the piston and the rotation of the crank the rolling surface will move correctly over the gudgeon pin owing to the spherical surface at the end of the connecting rod in the cylindrical wall of the piston.

Instead of the spherical surface at the end of the connecting rod the same may be made cylindrical, and the corresponding bearing part on the inner surface of the piston should then consist of plane surfaces, so forming a prismatical portion.

In theory a correct rolling motion on the surface of the connecting rod over the gudgeon pin requires some play, or inversely in the absence of such a play a correct rolling will not be quite possible, thus resulting in a partly sliding action. This, however, is not a drawback because in horizontal machines, in which the pressure of the piston and hence likewise the frictional resistance is very small at the end of the back-stroke, a small deviation in the middle of the stroke is of no consequence, as no locking in is then required. When starting, the machine is placed in the top position, this being the exact position for a correct rolling.

In fast-running machines with heavy gearing appliances, in which the inertia may exceed the pressure of the piston, this will occur during the fore-stroke even past the lower dead point. The deviation of the lateral locking is then likewise so slight, that a correct rolling is secured as soon as the gudgeon pin and the underside of the frame come in touch with each other.

This shows, that a lateral locking answers the purpose, because it prevents the contravention of a correct rolling there where same is required.

Figure 3:
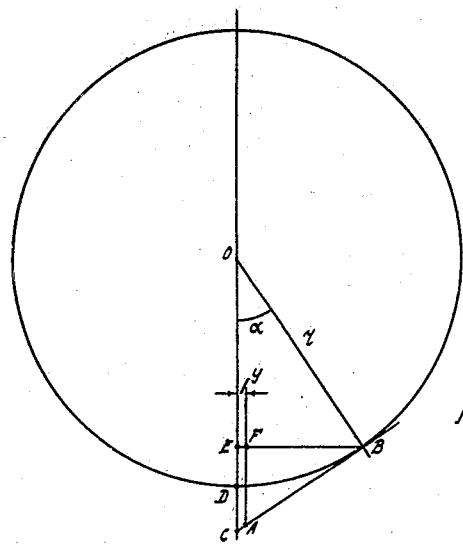

Moreover the deviation is practically of so little consequence, that it may be neglected, as is shown in Figure 3, from which the resulting deviation may be calculated. The surface of motion according to the line C A B has arrived by correct rolling over the circle with a radius $r$ in the position, in which the connecting rod has obtained the utmost deviation from its middle position. Therefore $AB = $ arc $DB$ and the necessary play $(y)$ corresponds with the distance horizontally taken from point A down to the centre line of the connecting rod in the middle position (OC). Hence $$y = EF = EB - FB$$
$$= r \sin \alpha - AB \cos \alpha$$
$$= r \sin \alpha - \text{arc } BD \cos \alpha$$
$$= r \sin \alpha - r \alpha \cos \alpha$$

For a practical execution $r$ may be $\frac{75}{2}$ mms. and $\alpha = 12.50$ (for a ratio of the connecting rod to the crank $= 4\frac{1}{2}:1$).

Then $y = \frac{75}{2} \times 0.21644 - \left[ \frac{75}{2} \times \frac{2\pi \times 12.5}{360} 0.97630 \right] = 0.15650$ mms.

In case there is no play, the sliding $(g)$ of the roll-plate $= CA = CB - AB$ hence $$g = r \text{ tang } \alpha - \text{arc } EB = r \text{ tang} - r \alpha$$

or in the execution given by way of example $$g = \frac{75}{2} \times 0.22169 - \left[ \frac{75}{2} \times \frac{2\pi \times 12.5}{360} \right] = 0.14 \text{ mms}$$

Figure 4:
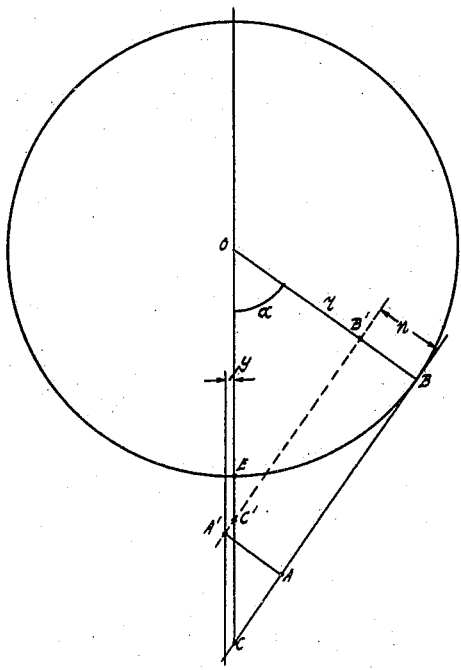

From this it follows that the deviations in a practical example are indeed very slight, but moreover it is possible to render them still slighter by arranging the axis of the revolving body as much above the surface of rolling that in both the uttermost positions of the connecting rod the said axis coincides again, just as in the middle position, with the centre line of the piston or so doing is centred accurately with respect to the guide in the wall of the piston. Then deviations will appear in the positions between the middle and the uttermost positions which may be determined with the help of Figure 4. This figure as in Figure 3 shows a position (OB) of the centre line of the connecting rod. Because the centre of the revolving body is situated at a distance $n$ above the surface of motion C A B, the same has arrived in the position AB on the spot $A^1$ when the surface of motion is rolling correctly over the circle representing the gudgeon pin.

In this case the required play $$y = A^1 C^1 \cos \alpha$$
$$y = (A^1 B^1 - C^1 B^1) \cos \alpha$$
$$= [AB - (OB - B^1 B) \text{ tang } \alpha] \cos \alpha$$
$$= [\text{arc } EB - (r - n) \text{ tang } \alpha] \cos \alpha$$
$$= [r\alpha - (r - n) \text{ tang } \alpha] \cos \alpha$$

If the distance $n$ be such that at the uttermost deviation of the connecting rod $(\alpha = 12.5°)$ $A^1$ has arrived again on the line OC, thus $y = o$, then:

$r\alpha = (r - n)$ tang $\alpha$, hence if the radius of the pinion $= \frac{75}{2}$ mms.

$$37.5 \times \frac{2\pi \times 12.5}{360} = (r - n) \times 0.22169$$

resulting in $r - n = 36.874$ or $n = 0.626$ mms.

At about half the deviation $(\alpha = 6°)$ the largest deviation will appear determining also the required play.

Said play will then be $$y(6°) = \left[ 37.5 \times \frac{2\pi \times 6}{360} - 36.874 \times 0.10510 \right] 0.99452$$

$$y = 0.0497 \text{ mms.}$$

This shows that by a slight displacement (about 0.6 mms.) of the centre upwards the required play is reduced to about 0.05 mms.

Instead of calculating $n$ for the supposition $y = o$ when $\alpha = 12.5°$, $n$ may also be determined for $y = o$ with an intermediate angle e. g. $\alpha = 6°$ and then be calculated which play will be required when $\alpha = 12.5°$.

At all events said deviation is so unimportant that on the other hand the considerable advantage of this arrangement will be that in case the machine is not acting e. g. is rotated by hand the end of the connecting rod will remain in the proper position and will not fall aside in consequence of the lateral space, by which when starting the gudgeon pin and the flat plate will not roll upon each other but will during the first half of the stroke slide over each other until the correct position is reached. Another advantage of the arrangement according to the invention is that the same may also be applied to horizontal machines.

What I claim is:—

1. In an engine, a piston, a wrist pin therein, a connecting rod having a frame-like end, an adjustable rolling surface on said frame end contacting the pin, the frame end being formed at the outside partly as a revolving body, the axis of revolution of the revolving body coinciding, in the medial position of the connecting rod, with the line of contact of said rolling surface on the wrist pin, and means on the inner part of the piston adapted to guide said revolving body.

2. In an engine, a piston, a wrist pin therein, a connecting rod having a frame-like end for the wrist pin, a bearing member at the underside of the frame-like end of the connecting rod, an adjustable member at the upper part of the frame-like end, the frame end being formed at the outside partly as a revolving body, the axis of revolution of the revolving body coinciding, in the medial position of the connecting rod, with the line of contact of the bearing member with the wrist pin, and means on the inner part of the piston adapted to guide said revolving body.

3. In an engine, a piston, a wrist pin therein and a connecting rod having a frame-like end, the underside of the frame-like end of the connecting rod having a bearing member for the wrist pin and the upper portion having an adjustable member, said frame-like end having a substantially spherical portion closely fitting within the piston, the axis of the spherical portion coinciding, in the medial position of the connecting rod, with the line of contact of the bearing member with the wrist pin.

In testimony whereof I have signed my name to this specification.

JAN BRONS.